Patented June 3, 1952

2,599,007

UNITED STATES PATENT OFFICE 2,599,007

21-HALOCHOLADIENES

Charles Meystre and Albert Wettstein, Basel, Switzerland, assignors to Ciba Pharmaceutical Products, Inc., Summit, N. J.

No Drawing. Application April 16, 1947, Serial No. 741,954. In Switzerland April 30, 1946

10 Claims. (Cl. 260—397.3)

The present invention relates to new halogen compounds and to a process for the preparation thereof.

Halogen has heretofore been introduced into a methylene group in $\alpha$-position to an olefinic double bond, i. e. in the allyl position adjacent to the double bond, with the aid of N-bromosuccinimide. However, application of this method to compounds which contain a two- or more-fold conjugated system instead of a single double bond has not heretofore been successful (see Ziegler et al., Annalen der Chemie, 551, 97 [1942]). Similarly unsuccessful has been the halogenation of a methyl group in $\alpha$-position to the conjugated system of a poly-olefine, since such a group even in $\alpha$-position to a single double bond reacts more difficultly than does a methylene group.

A primary object of the present invention is the embodiment of a process whereby the aforesaid deficiency is obviated and whereby a new class of halogen compounds is made available.

It has now been found that, unexpectedly, halogen compounds can be prepared by treating, in the presence of light, di- or poly-olefines with conjugated double bonds which contain at least one methyl group in $\alpha$-position to the conjugated system, with a carboxylic acid imide, amide, or arylamide, which is halogenated at the nitrogen atom.

As a starting material for the new process, use may be made of any compound which contains two or more conjugated carbon-carbon double bonds in an aliphatic, alicyclic or heterocyclic radical and also contains at least one methyl group in $\alpha$-position, i. e. in allyl position, to the said conjugated system. Accordingly, there are suitable for example: compounds of the type of pentadiene-(1,3), such as 1,1-diphenylpentadiene - (1,3), 1,1-diphenyl-4-methyl-pentadiene-(1,3) (prepared for example from corresponding monoenes according to the bromosuccinimide method); menthadienes, such as $\alpha$-terpinene; and more particularly also compounds of the steroid series with conjugated double bonds in the side chain, for example $\Delta^{20,23}$-3-acyloxy- or -3,12-di-acyloxy- or -3,7,12-triacyloxy-24,24-diphenyl-choladienes, $\Delta^{20,23}$-3-keto- or -3,11-diketo- or -3,12-diketo- or 3,7,12-triketo-24,24-diphenyl-choladienes, $\Delta^{20,23}$-3-acyloxy-11- or -12-keto-24,24-diphenyl-choladienes, $\Delta^{20,23}$-3-keto-11- or -12-hydroxy- or acyloxy - 24,24-diphenyl-choladienes, $\Delta^{5,20,23}$-3-acyloxy-24,24-diphenyl-chlolatrienes, $\Delta^{4,20,23}$-3-keto-24,24-diphenyl - cholatrienes, $\Delta^{4,20,23}$-3-keto-11- or -12-hydroxy- or -acyloxy-24,24-diphenyl-cholatrienes, $\Delta^{4,20,23}$-3-11- or -3,12-diketo-24,24-diphenyl-cholatrienes, as well as analogous compounds which contain an 11,12-double bond instead of substituents in 11- or 12-position.

In lieu of compounds of the steroid series with conjugated side-chain double bonds and a further double bond in the cyclopentanopolyhydrophenanthrene nucleus it is of advantage to use compounds whose nuclear double bond is protected, e. g. by saturation with halogen or particularly with hydrogen halide, if such protection is not rendered superfluous by the relatively inert character of the double bond. The latter is the case e. g. with C=C groupings which contain a keto group in $\alpha$-position or with those which are situated between two tertiary carbon atoms. Compounds with a protected nuclear double bond are prepared, e. g. by protecting the nuclear double bond of cyclopentanopolyhydrophenanthrene compounds which initially have only one double bond in the side chain, halogenating, e. g. with carboxylic acid imides, and splitting off hydrogen halide under conditions which do not affect the protection of the nuclear double bond, e. g. by simple heating.

The above keto-group-containing polyenes can be obtained for example from the corresponding hydroxy-polyenes, part of the hydroxyl groups of which may if necessary be present in esterified form (partial acylation of polyhydroxy compounds or partial saponification of poly-acyloxy compounds), by the action of aluminum alcoholates and ketones; 11-keto-polyenes are advantageously prepared from 11-keto-acid esters by Grignardation and introduction of the double bonds. The 11,12-unsaturated steroids can be prepared for example from compounds, which have in the 12-position a radical which can be split off (such as a benzoyloxy, anthraquinone-carboxy, p-toluol-sulfoxy or methanesulfoxy group), by splitting off the said radical together with a hydrogen atom at the 11-carbon atom.

The starting material is treated with a dicarboxylic acid imide derivative which is halogenated at the nitrogen atom, i. e. substituted for example by chlorine, bromine or iodine—such as an N-halogen-succinimide, -phthalimide, -parabanic acid, -cyanuric acid, -hydantoin or -barbituric acid. In lieu thereof, use may also be made of a corresponding derivative of a primary or secondary carboxylic acid amide, such as of acetamide, propionamide or diacetamide, or of a carboxylic acid anilide, for example of a nuclearly halogenated or nitrated acetanilide or benzanilide. The thus-effected halogenation of the methyl groups in α-position to the conjugated system is, according to the invention, carried out in the presence of light. For this purpose, use may be made of various sources of light with and without an ultraviolet portion, such for example as light from incandescent lamps, quartz lamps, arc lamps, and also strong natural light such as direct sunlight. The exposure to light presents primarily the advantage that the rate of the reaction is greatly enhanced. In many cases, it is due to this expedient that acceptable yields become possible at all. Moreover, side reactions are to a great extent suppressed. The introduction of halogen is preferably effected in inert solvents or diluents, such as carbon tetrachloride, chloroform, benzene, cyclohexane, methylcyclohexane, ethyl ether or dioxane. The reactants are in most cases employed in substantially stoichiometric quantities. If the starting materials are compounds containing substituents which are sensitive to the halogenating means, these substituents may be temporarily protected; particularly are free hydroxyl groups e. g. esterified or etherified. Esters of aromatic acids, such as benzoic acid, are in contrast to the free hydroxyl compounds quite stable toward the said halogenating means, and also esters of aliphatic acids are generally more slowly attacked than the active methyl groups. If necessary, free keto groups can be protected by conversion into acetals, particularly of glycols. It has been found, however, that free keto groups and particularly isolated groups or those in conjugation to a carbon double bond are also relatively little sensitive.

Protected nuclear double bonds can be regenerated. When such protection was effected e. g. by saturation with halogen or hydrogen halide, the nuclear double bond may be regenerated in per se known manner by splitting off halogen or hydrogen halide, respectively.

The products of the process are di- or polyolefins with conjugated double bonds which contain a halogen methyl group in α-position to the conjugated system. They may serve as intermediates for the preparation of pharmaceuticals. $\Delta^{20,23}$-21-halogen-choladienes are very useful and among them, $\Delta^{20,23}$-21-halogen-24,24-diphenyl-choladienes are especially valuable. Mention may be made e. g. of $\Delta^{20,23}$-21-halogen-24,24-diphenyl-choladienes, which contain a hydroxy, acyloxy or keto group in 3-position and if desired a hydroxy, acyloxy or keto group in 11- or 12-position or an 11,12-double bond. These 3-hydroxy or 3-acyloxy compounds may also contain a halogen atom in 5-position and the 3-keto compounds a 4,5-double bond. These new compounds permit, inter alia, a considerable simplification of the production of adrenal cortical hormones.

The following examples illustrate the invention without however being intended to be limitative thereof. The relationship between parts by volume and parts by weight is the same as that which exists between the liter and the kilogram.

Example 1

1 part by weight of 1,1-diphenyl-4-methyl-pentadiene-(1,3) is dissolved in 50 parts by volume of carbon tetrachloride. 0.45 part by weight of N-bromo-succinimide is added to the solution, which is then heated for two hours while being exposed to the light from a strong incandescent lamp. It is then cooled, the succinimide suction-filtered off, and the filtrate evaporated in vacuo. The residue is a substantially colorless oil which, according to analysis, is 1,1 - diphenyl - 4 - methyl - 5 - bromo - pentadiene-(1,3). The compound possesses a very reactive halogen atom which can not however be readily split off as hydrogen bromide.

Example 2

2 parts by weight of $\Delta^{20,23}$-3,12-diacetoxy-24,24-diphenyl-choladiene in 100 parts by volume of carbon tetrachloride are heated to boiling for 20 minutes with 0.6 part by weight of N-bromo-succinimide while being exposed to the light of a strong incandescent lamp. The solution is then cooled, suction-filtered from the formed succinimide, and the filtrate evaporated in vacuo. Recrystallized from isopropyl ether, the residue yields $\Delta^{20,23}$-3,12-diacetoxy-21-bromo-24,24-diphenyl-choladiene in the form of colorless fine needles of M. P. 195–196° C.

The 21-bromine atom of this compound is in fact very reactive; it is not split off as hydrogen bromide even after being heated for an hour with pyridine; there is formed instead a pyridinium-bromide which gradually decomposes at around 200° C. and corresponds by analysis to

$C_{45}H_{54}O_4NBr$

Example 3

20 parts by weight of $\Delta^{20,23}$-3-acetoxy-5-chloro-24,24-diphenyl-choladiene and 6.21 parts by weight of bromo-succinimide are covered with 200 parts by volume of carbon tetrachloride. The product is heated to boiling for 20 minutes while exposing to light from a strong incandescent lamp. The formed succinimide is suction-filtered from the cooled reaction mixture and the filtrate evaporated in vacuo. The residue yields, recrystallized from isopropyl ether, $\Delta^{20,23}$-3-acetoxy-5-chloro - 21 - bromo - 24,24 - diphenyl-choladiene, which melts at 198–208° C. with decomposition.

Example 4

10 parts by weight of $\Delta^{20,23}$-3-keto-12-acetoxy-24,24-diphenyl-choladiene of M. P. 104–108° C. (prepared e. g. by dehydrogenation of $\Delta^{20,23}$-3-hydroxy - 12 - acetoxy-24,24-diphenyl-choladiene by means of cyclohexanone in presence of aluminium isopropylate), are admixed with 100 parts by volume of carbon tetrachloride and 3.23 parts by weight of bromosuccinimide and heated to boiling for 20 minutes while exposing to strong light with an incandescent lamp. The cooled solution of the resultant bromide is suction-filtered from the formed succinimide and is evaporated in vacuo. Recrystallized from acetone, the residue gives $\Delta^{20,23}$-3-keto-12-acetoxy - 21 - bromo-24,24-diphenyl-choladiene. It forms colorless prisms having an initial M. P. of 120–122° C. and, after re-solidification, one of 194° C.

Similarly, $\Delta^{20,23}$-3-keto-12-para-toluolsulfoxy-21-bromo-24,24-diphenyl-choladiene can be prepared from $\Delta^{20,23}$-3-keto-12-para-toluolsulfoxy-24,24-diphenyl-choladiene. The latter is obtained, e. g. from $\Delta^{20,23}$-3-keto-12-acetoxy-24,24-diphenyl-choladiene by alkaline saponification and reaction with para-toluolsulfachloride in pyridine.

Example 5

1 part by weight of $\Delta^{4,20,23}$-3-keto-24,24-diphenyl-cholatriene is dissolved in 20 parts by volume of carbon tetrachloride; the solution admixed with 0.363 part by weight of N-bromosuccinimide and heated to boiling for 10 minutes while exposing to light from a strong incandescent lamp. The reaction mixture is cooled, the formed succinimide suction-filtered off, and the solution evaporated in vacuo. The oily residue is $\Delta^{4,20,23}$-3-keto-21-bromo-24,24-diphenyl-cholatriene. This compound contains a very reactive bromine atom. However, on heating with pyridine, it splits off no hydrogen bromide but rather goes over into a pyridinium-bromide.

*Example 6*

The starting material for this Example is prepared e. g. in the following manner: $\Delta^{20,23}$-3-hydroxy-12-acetoxy-24,24-diphenyl-choladiene is dehydrogenated to $\Delta^{20,23}$-3-keto-12-acetoxy-24,24-diphenyl-choladiene. The latter is saponified, the 12-hydroxyl group esterified by allowing the material to stand for six days in pyridine with an excess of para-toluolsulfochloride and, finally, split off by heating to 140° C. for 15 hours with pyridine in a pressure vessel.

10 parts by weight of the thus obtained $\Delta^{11,20,23}$-3-keto-24,24-diphenyl-cholatriene and 3.63 parts by weight of N-bromosuccinimide in 100 parts by volume of carbon tetrachloride are boiled on the water bath for 20 minutes while being exposed to light from a strong incandescent lamp. The reaction mixture is cooled, the solution suction-filtered from the formed succinimide and evaporated in vacuo. The residue is the crude $\Delta^{11,20,23}$-3-keto-21-bromo-24,24-diphenyl-cholatriene. It can be recrystallized from acetone or isopropyl ether and is thus obtained in pure state.

*Example 7*

4.32 parts by weight of $\Delta^{20,23}$-3,12-diacetoxy-24,24-diphenyl-choladiene and 1 part by weight of N-bromoacetamide in 100 parts by volume of carbon tetrachloride are heated to boiling for 15 minutes while exposing to light from a strong incandescent lamp. The cooled solution is briefly washed with cold water, dried and evaporated in vacuo. Recrystallized from isopropyl ether, the residue gives the $\Delta^{20,23}$-3,12-diacetoxy-21-bromo-24,24-diphenyl-choladiene of M. P. 195–196° C. described in Example 2.

*Example 8*

2 parts by weight of $\Delta^{20,23}$-3,12-diacetoxy-24,24-diphenyl-choladiene and 2.6 parts by weight of N-bromo-2,4,6-tribromacetanilide in 100 parts by volume of carbon tetrachloride are heated to boiling for 15 minutes while being exposed to light from a strong incandescent lamp. The solution is then evaporated in vacuo and the residue treated with ether. The ether-solution is filtered off from the 2,4,6-tribromacetanilide and upon evaporation leaves behind the crude $\Delta^{20,23}$-3,12-diacetoxy-21-bromo-24,24-diphenyl-choladiene described in Example 2, which can be obtained in pure state from isopropyl ether and melts at 195–196° C.

*Example 9*

17 parts by weight of $\Delta^{20,23}$-3,11-diketo-24,24-diphenyl-choladiene and 6 parts by weight of N-bromosuccinimide in 200 parts by volume of carbon tetrachloride are heated to boiling for 20 minutes while exposing to light from a strong incandescent lamp. The cooled solution is suction-filtered from the formed succinimide, evaporated in vacuo, and the residue recrystallized from isopropyl ether. $\Delta^{20,23}$-3,11-diketo-21-bromo-24,24-diphenyl-choladiene is thus obtained in the form of colorless crystals.

The $\Delta^{20,23}$-3,11-diketo-24,24-diphenyl-choladiene used as starting material can be prepared from 3-hydroxy-11-ketocholanic acid methyl ester in the following manner: This ester is caused to react with phenylmagnesium bromide to form 3,24-dihydroxy-11-keto-24,24-diphenyl-cholane, water is then split off from the resultant teritary alcohol, and the 3-hydroxy group subsequently acetylated. The resultant $\Delta^{23}$-3-acetoxy-11-keto-24,24-diphenyl-cholene is caused to react with N-bromosuccinimide and hydrogen bromide split off from the formed 22-bromide. The $\Delta^{20,23}$-3-acetoxy-11-keto-24,24-diphenyl-choladiene obtained is then subjected to alkaline saponification and converted into the above mentioned starting material by dehydrogenation in a toluol-syclohexanone mixture in the presence of aluminium isopropylate.

Having thus described the invention, what is claimed is:

1. A $\Delta^{20,23}$-21-halogen-choladiene.
2. A $\Delta^{20,23}$-21-halogen-24,24-diphenyl-choladiene.
3. A $\Delta^{20,23}$-3-keto-21-halogen-24,24-diphenyl-choladiene containing an additional 4,5-double bond and being free from further ring substituents.
4. A $\Delta^{20,23}$-3-keto-halogen-24,24-diphenyl-choladiene containing an additional 4,5-double bond.
5. $\Delta^{20,23}$-3,12-diacetoxy-21-bromo-24,24-diphenyl-choladiene.
6. $\Delta^{20,23}$-3,11-diketo-21-bromo-24,24-diphenyl-choladiene.
7. A $\Delta^{20,23}$-3-keto-21-halogen-24,24-diphenyl choladiene.
8. A $\Delta^{20,23}$-3-acetoxy-21-halogen-24,24-diphenyl-choladiene.
9. A $\Delta^{20,23}$-3-keto-21-halogen-24,24-diphenyl-choladiene containing, as sole further substituent, a keto group in position 11.
10. A $\Delta^{20,23}$-3-acetoxy-21-halogen-24,24-diphenyl-choladiene containing, as sole further substituent, an organic acyloxy group in position 12.

CHARLES MEYSTRE.
ALBERT WETTSTEIN.

REFERENCES CITED

The following references are of record in the file of this patent:

UNITED STATES PATENTS

| Number | Name | Date |
|---|---|---|
| 2,229,818 | Reichstein et al. | Jan. 28, 1941 |
| 2,326,228 | Kharasch et al. | Aug. 10, 1943 |

OTHER REFERENCES

Gould: Jour. Am. Chem. Soc., vol. 57, pp. 340–345 (1935).

Meystre et al.: Helv. Chim. Acta 27, pp. 1815–1824 (1944).